Oct. 27, 1931.  F. C. CRAWFORD ET AL  1,828,891
TIE ROD CONSTRUCTION
Filed Feb. 26, 1926   2 Sheets-Sheet 1

INVENTORS:
FREDERICK C. CRAWFORD
MATTHEW P. GRAHAM
BY
A. E. Merkel,
ATTORNEY.

Oct. 27, 1931.  F. C. CRAWFORD ET AL  1,828,891

TIE ROD CONSTRUCTION

Filed Feb. 26, 1926  2 Sheets-Sheet 2

INVENTORS:
FREDERICK C. CRAWFORD
MATTHEW P. GRAHAM
BY
ATTORNEY

Patented Oct. 27, 1931

1,828,891

UNITED STATES PATENT OFFICE

FREDERICK C. CRAWFORD AND MATTHEW P. GRAHAM, OF DETROIT, MICHIGAN, ASSIGNORS TO THOMPSON PRODUCTS INC., OF CLEVELAND, OHIO, A CORPORATION OF OHIO

TIE-ROD CONSTRUCTION

Application filed February 26, 1926. Serial No. 90,900.

Our invention relates to connecting rods such as are employed in tie rods for automobiles. The tie rod of an automobile is that rod which connects together two rigid arms projecting from the steering knuckles of the front wheels of an automobile, whereby they are caused to turn in unison when one of them is operated by the steering wheel.

For proper steering of an automobile it is necessary to give the front wheels what is known as a "toe-in", i. e., the front wheels must be arranged in planes, not vertical and parallel, but in planes slightly converging toward the front. As the tie rod is rigidly connected to the opposite steering knuckles and as the front stub axles are also rigid therewith, it is apparent that in order to give the front wheels the proper "toe-in" under all conditions, some means of adjustment of the tie rod or joint connections is necessary. In the usual construction, in order to provide this adjustment, the tie rod is made of two end members and an intermediate member, which are relatively adjustable.

It is the object of this invention to reduce the weight of such parts, which are ordinarily made from a metal rod of circular cross section, without sacrifice of strength, and so to devise a ball-joint, employing a ball stud and means for connecting it to such a structural shape, as to permit ready adjustment of the ball stud relative to the intermediate part of the rod.

The reduction in weight is accomplished by employing structural shapes, such as I-beams and channel bars, with which is combined a novel form of holding and adjusting means for the ball stud.

The invention may be embodied in different forms, and for exemplary purposes we describe herein modifications of the structural shape, modification of the ball-joint construction, the holding means therefor, and of the means for effecting adjustment of the joint with respect to the intermediate part of the connecting rod. For most purposes we prefer the form shown in Figs. 1 to 6, in which is employed a ball seat having an eccentric bore forming the bearing surface for a ball stud, which forms part of the subject-matter of a copending application Serial No. 76,448 filed December 19, 1925, by Matthew P. Graham.

Figure 1:
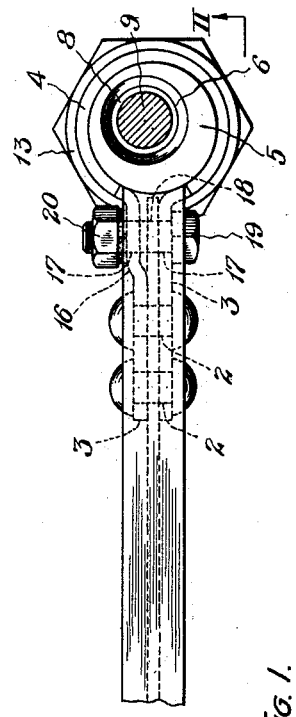
Figure 1 is a plan view of a tie rod with an intermediate member made of I-beam cross section with an adjustable ball-joint.

Referring to the drawings in detail, which disclose the application of the invention to an automobile tie rod and in which the same reference numeral designates the same part throughout, an intermediate member 1, of I-beam cross section, is provided, near its ends, with one or more apertures 2, providing means for rigid connection with correspondingly apertured shanks 3 forming the ends of a loop 4, preferably of spring steel, adapted to receive and hold a ball joint. The ball joint preferably consists of a ball seat 5 of cylindrical contour, having therein an eccentric bore 6, contracted at its upper end to form a segmental spherical bearing surface 7 for the ball 8 of a ball stud, the shank 9 of which extends through the contracted end of a ball seat and forms a bearing for a connected part 10, held in place by a castellated nut 11 threaded onto the end of the shank and held from rotation by a cotter pin 12. The ball seat is provided at its lower end with an outwardly projecting flange 13, adapted to be engaged by the lower edge of the loop 4, and the lower end of the eccentric bore is closed by a plate 14 and felt washer 15, or in any other suitable way. This form of ball joint is not a part of this invention, but forms the subject-matter of a copending application Serial No. 76,448, filed December 19, 1925 by Matthew P. Graham. The present invention is concerned with the combination of a ball joint having the general characteristics described with an intermediate member of structural shape.

By reason of the eccentric location of the bore 6 in the ball seat 5 which forms the bearing surface for the ball stud, the rotation of the ball seat will adjust the relation between the shank of the stud and the intermediate member 1 to change the distance between the centers of the ball studs at opposite ends of the intermediate member. Provision must therefore be made to release the ball seat from clamping engagement with the loop 4 to permit its rotation. To this end the loop is preferably formed of spring steel, and is provided, between a shank 3 and the inner side of the loop, with a bend 16, normally spacing the outer end of the shank a slight distance from the outer end of the intermediate member. At this point the shanks are provided with apertures 17, and the end of the intermediate member 1 is provided with a registering aperture 18, to receive a bolt 19 provided with a nut 20. The set of the metal of the loop is such that normally the loop 4 is expanded to a diameter greater than the exterior diameter of the ball seat 5. Thus, while the shanks 3 are rigidly secured to the intermediate member 1, the loop 4 is normally of a size freely to permit the insertion or rotation of the ball seat, but when the nut 20 is set up tightly the loop 4 is contracted into firm clamping engagement therewith. In order to make the rotational adjustment of the ball seat, it will therefore be obvious that the nut is loosened, the adjustment is made, and the nut is again set.

Figure 4:
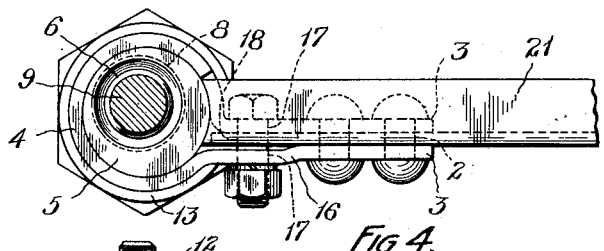
Fig. 4 is a fragmentary plan view of a modified form employing an intermediate member of channel-shape cross section.
Figure 5:
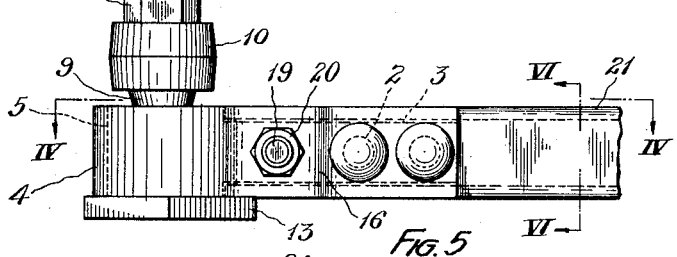
Fig. 5 is a side elevation of Fig. 4.
Figure 6:
Fig. 6 is a cross section on line VI—VI of Fig. 5.

The intermediate member may have other cross sectional forms. Figs. 4, 5 and 6 illustrating an intermediate member 21 of channel form, the construction otherwise being the same as above described.

Figure 2:
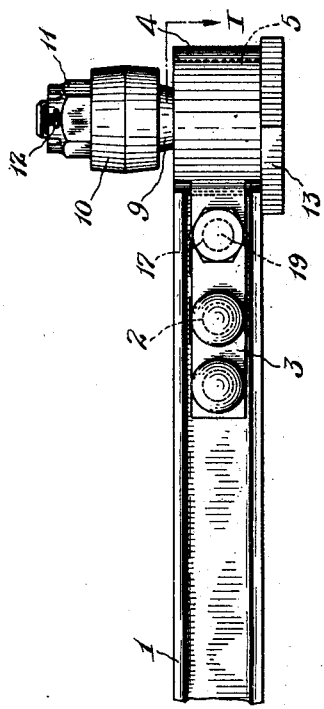
Fig. 2 is a side elevation of Fig. 1.
Figure 3:
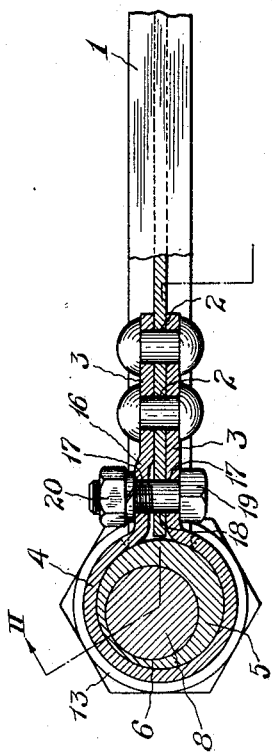
Fig. 3 is a cross section on line III—III of Fig. 2.
Figure 3:
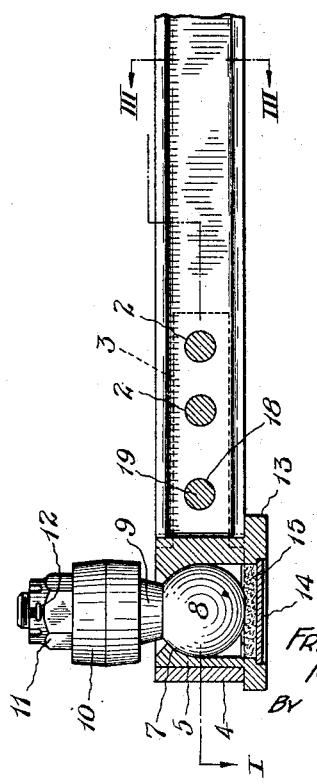
Figure 7:
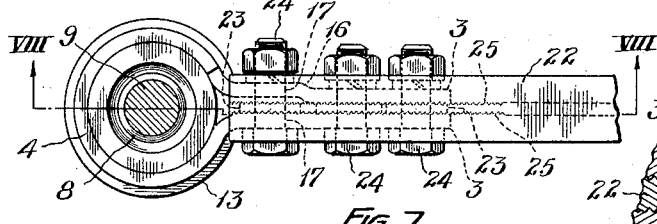
Fig. 7 is a plan view of the end of a modified form of tie rod using an intermediate member of I-beam cross section with a modified means of adjusting the ball joint with respect to the intermediate member.
Figure 9:
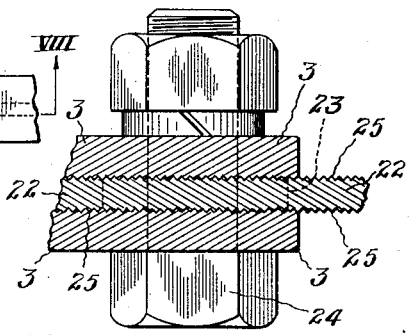
Fig. 9 is an enlarged plan section on line IX—IX of Fig. 8.
Figure 8:
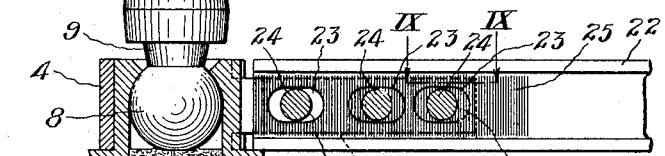
Fig. 8 is a section view along line VIII—VIII Fig. 7.

Instead of providing longitudinal adjustment of the ball stud shanks by means of a ball seat having an eccentric bore, such adjustment may be provided by employing a ball seat having a concentric bore with an adjustable connection between the loop and the intermediate member. Such an arrangement is illustrated in Figs. 7, 8 and 9, wherein an intermediate member 22 is provided near its ends, with elongated apertures 23, registering with a like number of apertures in the shanks 3 of the loop 4, through which pass bolts 24, to secure the shanks adjustably to the intermediate member. In order to prevent the engaging parts from relative movement under all conditions of use, the contacting surfaces of the shanks and intermediate member may be roughened, as by milling, as indicated at 25. In other particulars the construction may be the same as described and illustrated in Figs. 1 to 3.

Figure 10:
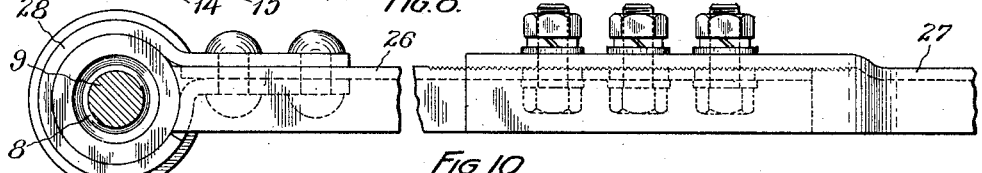
Fig. 10 is a plan view of another modification in which the intermediate member is made of two parts which are relatively adjustable.
Figure 11:
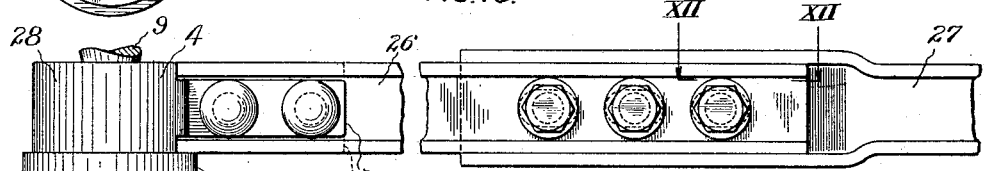
Fig. 11 is a side view of the form shown in Fig. 10.
Figure 12:
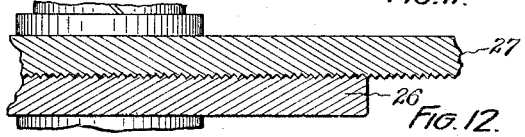
Fig. 12 is an enlarged vertical section on line XII—XII of Fig. 11.

Another modification is shown in Figs. 10 to 12, in which the intermediate member is constructed of a plurality of parts 26, 27, adjustable with respect to each other, the ball seat in this case being permanently clamped by straps 28 to the free ends of the members.

It will be apparent from the description above that we have provided a connecting rod which is light, yet strong, combined with a simple and effective ball joint having means, to adjust it in relation to the intermediate part of the rod. The features described may be varied in ways other than those described, and it is therefore to be understood that we have given only examples of the manner in which our invention may be embodied, and that the invention is not confined to the examples given but includes all structures falling within the terms of the appended claims.

What we claim is:

1. In a connecting rod, the combination with a ball seat having an outer cylindrical contour and a lower flange, of an intermediate member, a strap having a loop encircling the cylindrical surface of said ball seat with its lower edge resting upon the lower flange of said ball seat and means securing the ends of said strap to said intermediate member, said means clamping said loop about said ball seat.

2. In a connecting rod, the combination with a ball seat having an outer cylindrical contour and a lower flange, of an intermediate flanged member having a vertical web, a looped strap adapted to clampingly engage the cylindrical surface of said ball seat with its lower edge resting upon the lower flange of said ball seat and with its shanks extending on each side of said vertical web, the contacting surfaces of said shanks and web being milled, there being registering elongated apertures formed in said shanks and web and means passing through said elongated slots for adjustably securing said shanks to said web.

3. In a connecting rod, the combination with a ball seat having an outer cylindrical contour, of an intermediate member, a strap having a loop encircling the cylindrical surface of said ball seat with its lower edge resting upon the lower flange of said seat, a pair of parallel shanks extending from said loop for receiving an end of said intermediate member therebetween, one of said shanks being offset adjacent said loop to space said shank from the end of said intermediate member, and means passing through one of said shanks, said intermediate member and the offset portion of said other shank to secure said strap to said intermediate member, said means also drawing the offset portion of said shank into contact with said intermediate member to clamp said loop about said ball seat.

Signed by us this 22nd day of January, 1926.

MATTHEW P. GRAHAM.
FREDERICK C. CRAWFORD.